July 30, 1963 H. C. KENDALL 3,099,817
VEHICLE PERFORMANCE MONITORING SYSTEM
Filed Dec. 19, 1958 13 Sheets-Sheet 1
FIG.I.
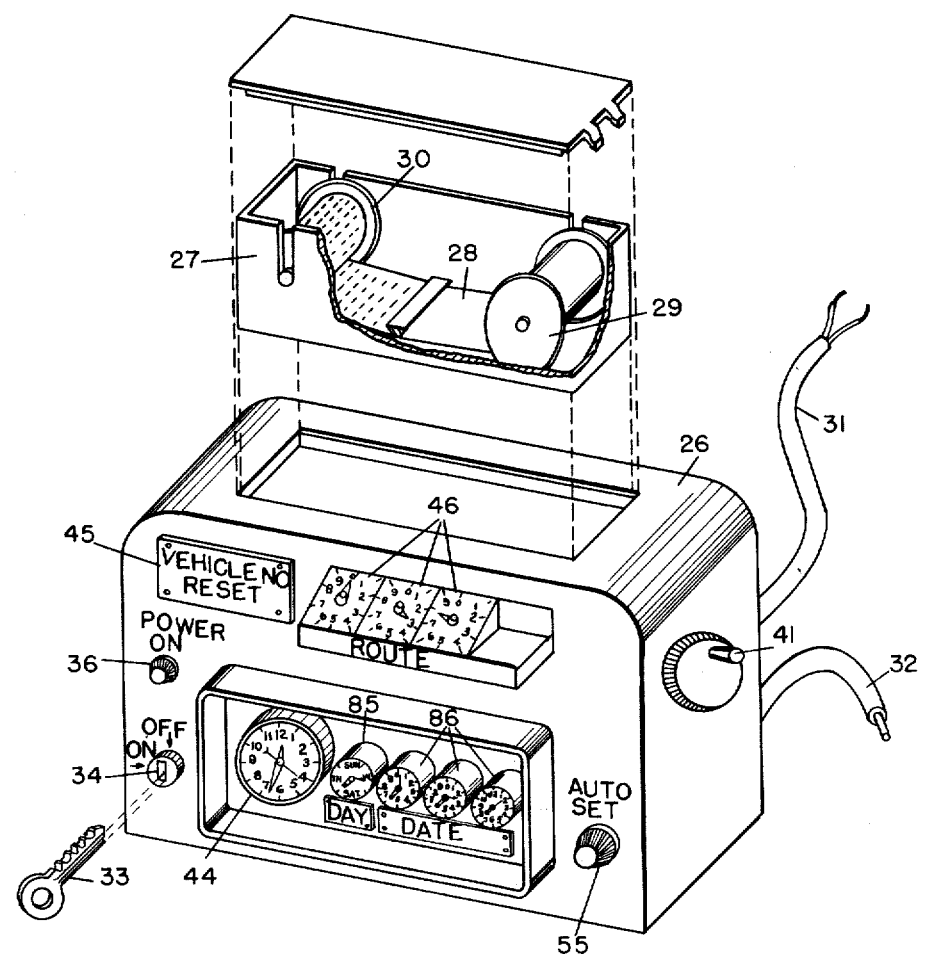
INVENTOR.
H.C.KENDALL
BY
Forest B. Hitchcock
HIS ATTORNEY

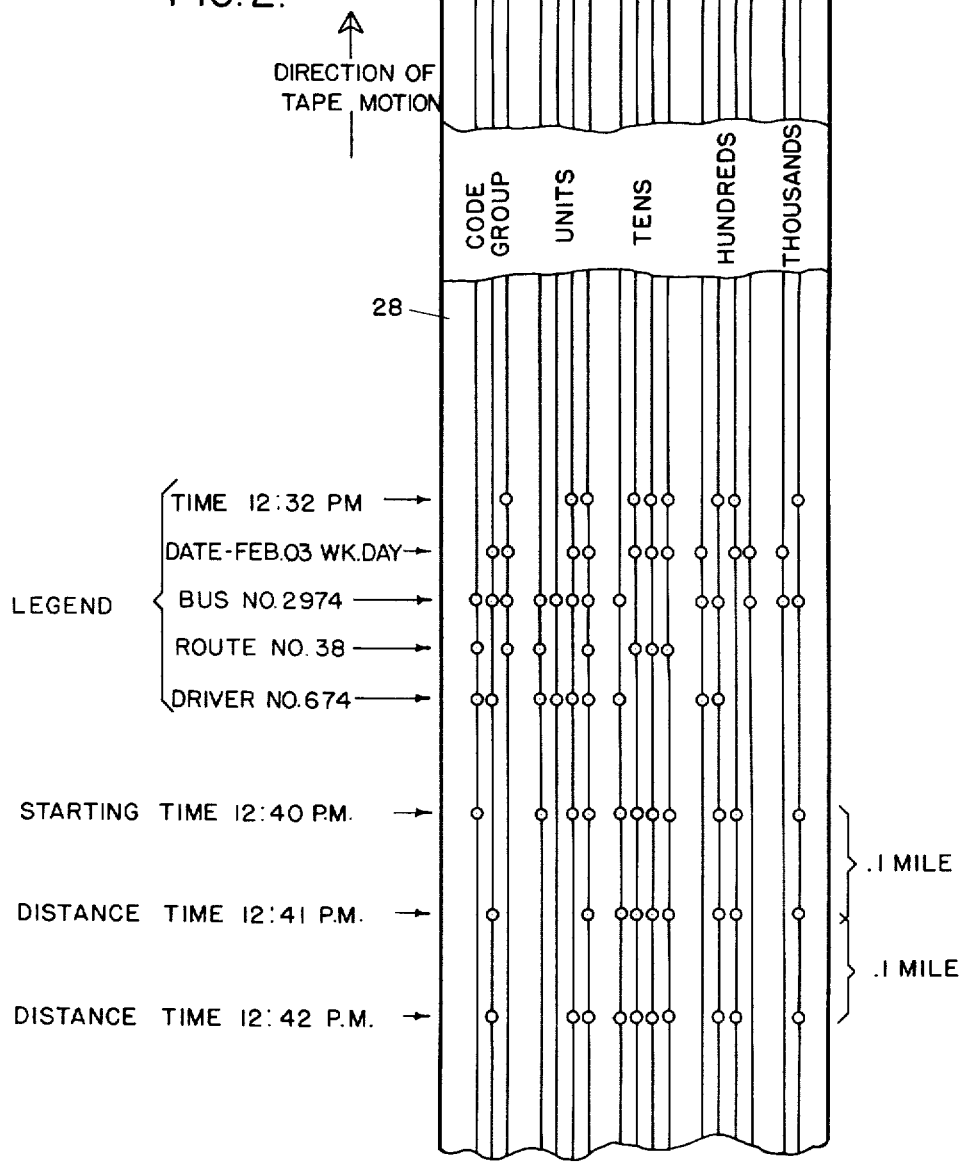

July 30, 1963        H. C. KENDALL        3,099,817
VEHICLE PERFORMANCE MONITORING SYSTEM
Filed Dec. 19, 1958                13 Sheets-Sheet 3

FIG. 3.

| MONTH | JAN. | FEB. | MAR. | APR. | MAY | JUNE | JULY | AUG. | SEPT. | OCT. | NOV. | DEC. |
|---|---|---|---|---|---|---|---|---|---|---|---|---|
| DIGITS | 1 | 2 | 3 | 4 | 5 | 6 | 7 | 8 | 9 | 0/10 | 11 | 12 |
| SOLENOID POSITION 1 | o | o | o | o | | | | o | o | o | | |
| SOLENOID POSITION 2 | | o | o | o | o | | | | | o | o | o |
| SOLENOID POSITION 3 | | | o | o | o | o | | | | o | | o |
| SOLENOID POSITION 4 | | | | o | o | o | o | o | o | o | o | |

FIG. 4.

| | | P.M. | A.M. | |
|---|---|---|---|---|
| | HOLIDAY 0 | SUNDAY 1 | SATURDAY 2 | WEEK DAY 3 |
| 1 | | o | o | |
| 2 | | | o | o |

FIG. 5.

| | LEGEND TIME | DATE | VEHICLE | ROUTE | DRIVER | STARTING TIME | DISTANCE-TIME |
|---|---|---|---|---|---|---|---|
| 1 | o | o | o | o | | | |
| 2 | | o | o | | o | | o |
| 3 | | | o | o | o | o | |

INVENTOR.
H.C. KENDALL
BY
HIS ATTORNEY

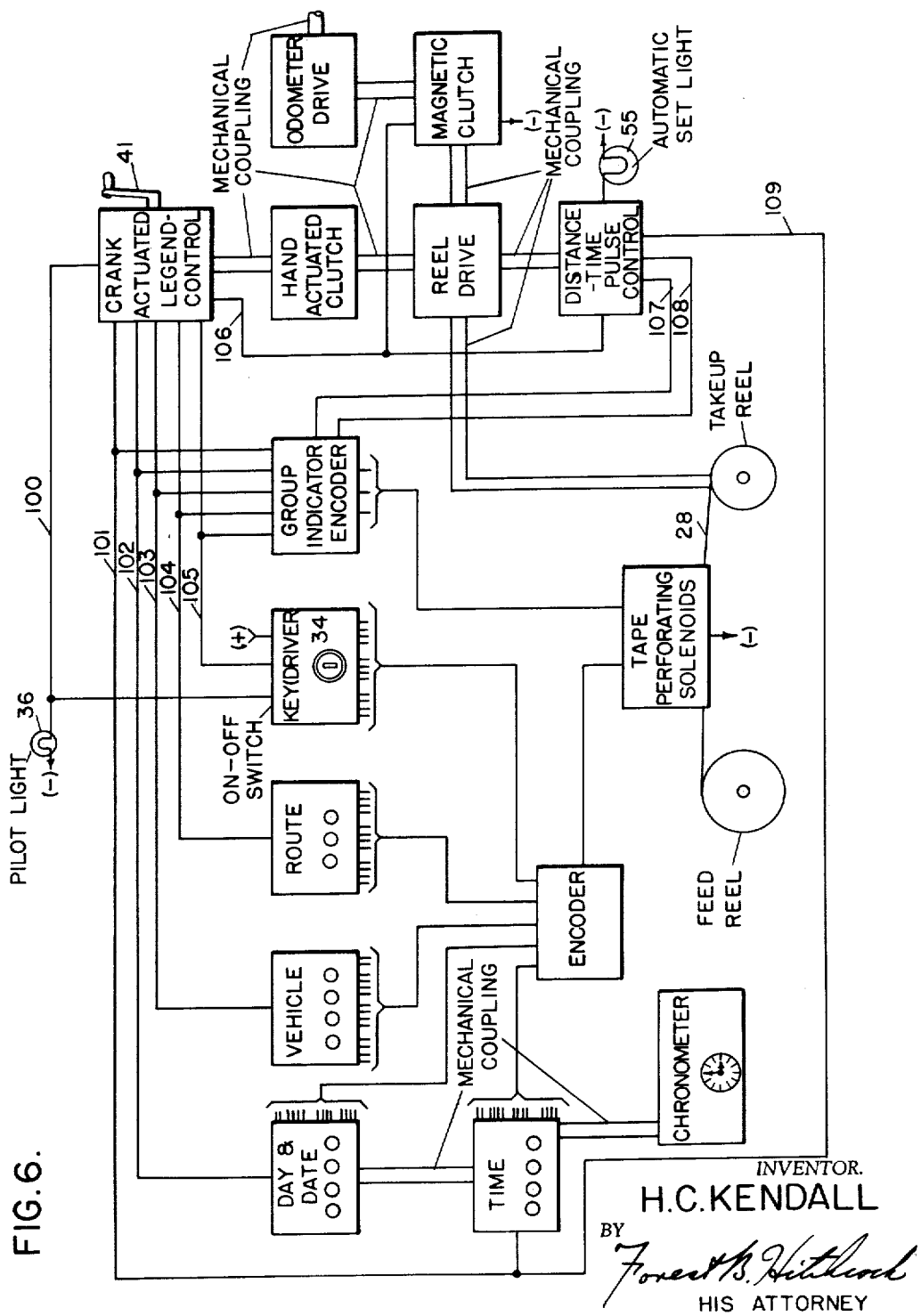

July 30, 1963  H. C. KENDALL  3,099,817
VEHICLE PERFORMANCE MONITORING SYSTEM
Filed Dec. 19, 1958  13 Sheets-Sheet 5

INVENTOR.
H.C. KENDALL
BY
HIS ATTORNEY

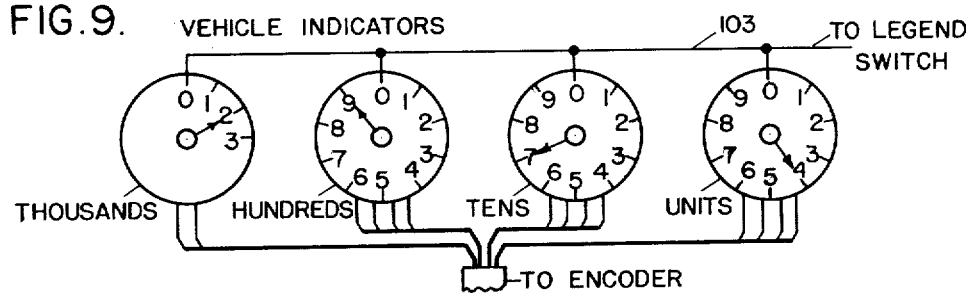
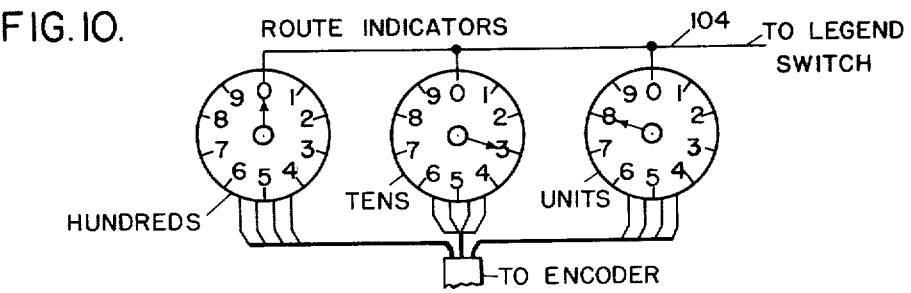
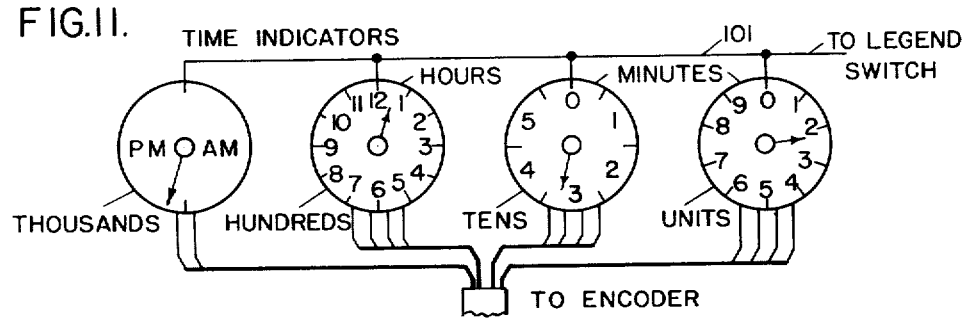
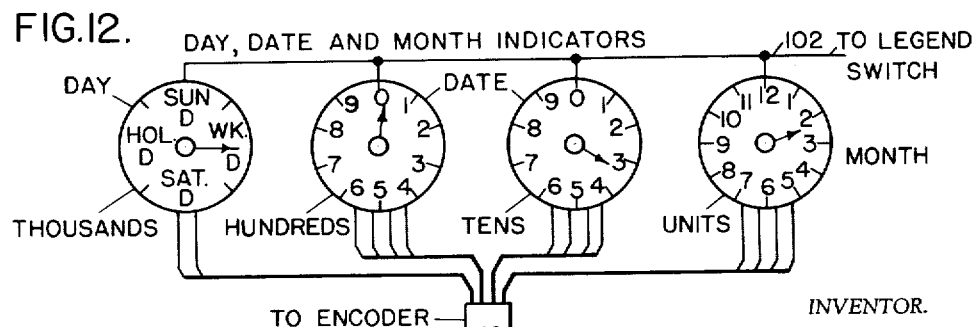

July 30, 1963 H. C. KENDALL 3,099,817
VEHICLE PERFORMANCE MONITORING SYSTEM
Filed Dec. 19, 1958 13 Sheets-Sheet 8

INVENTOR.
H.C. KENDALL
BY
Forest B. Hitchock
HIS ATTORNEY

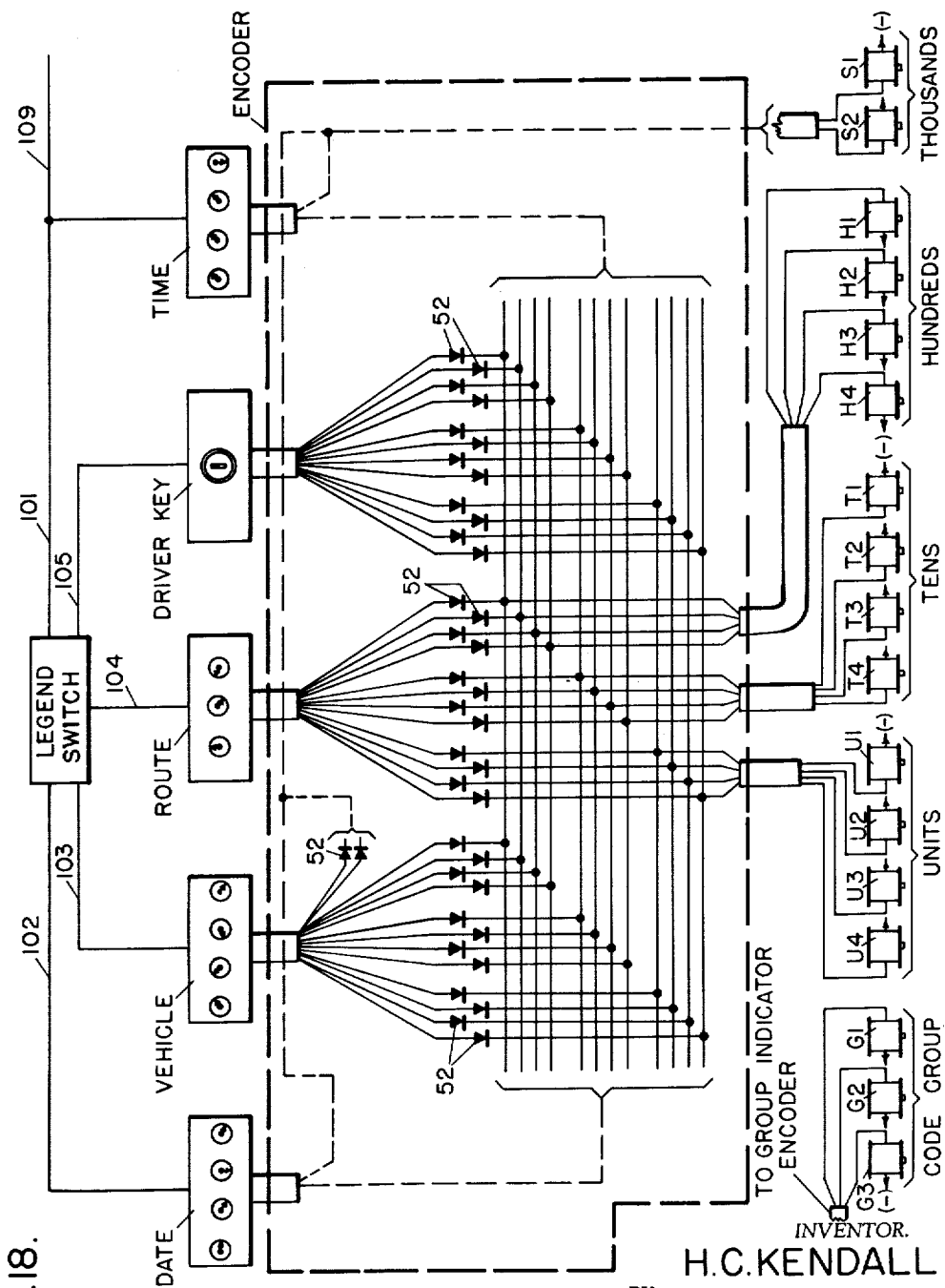

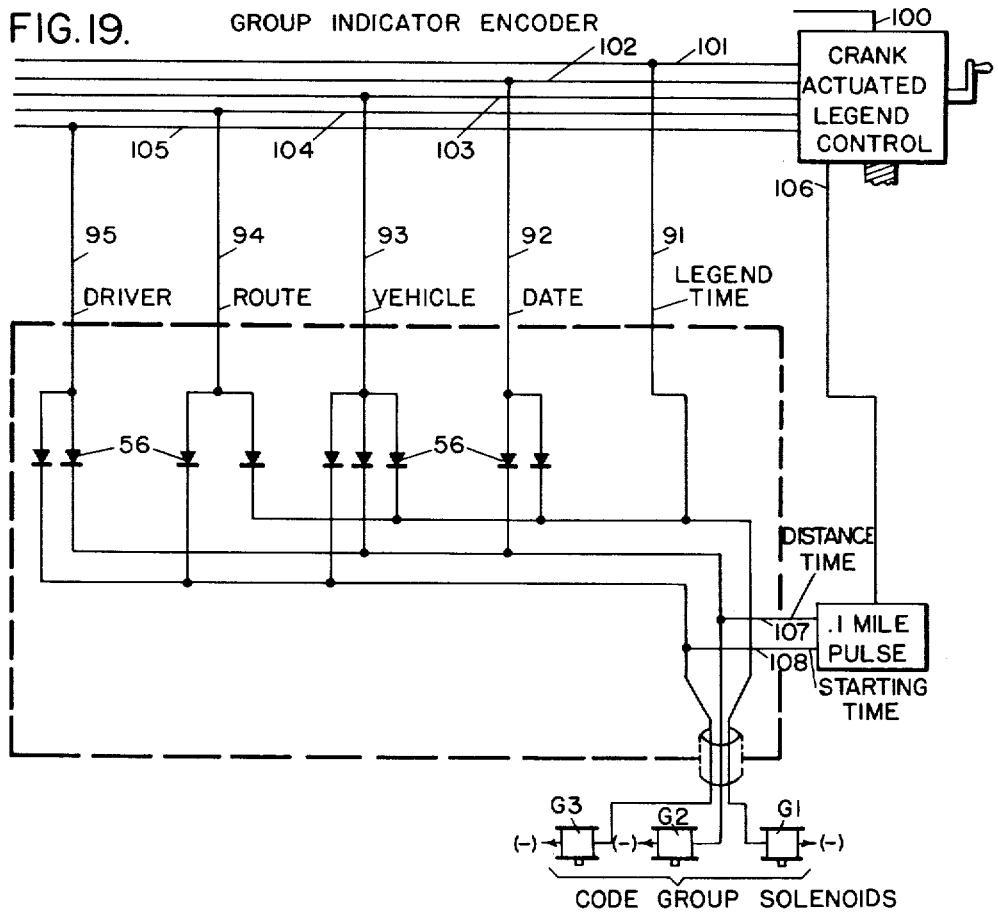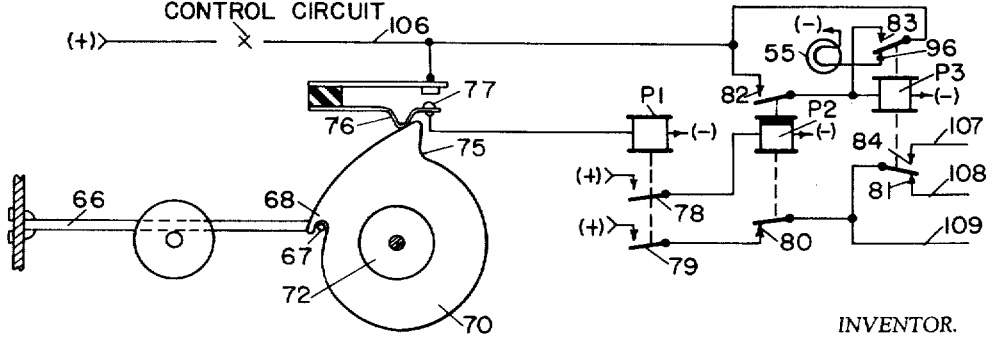

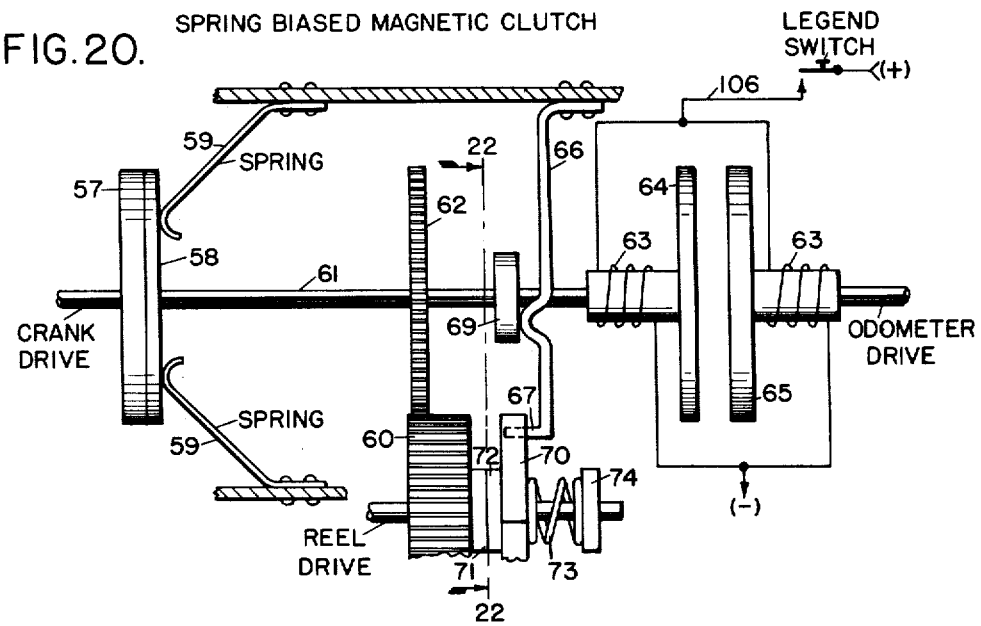
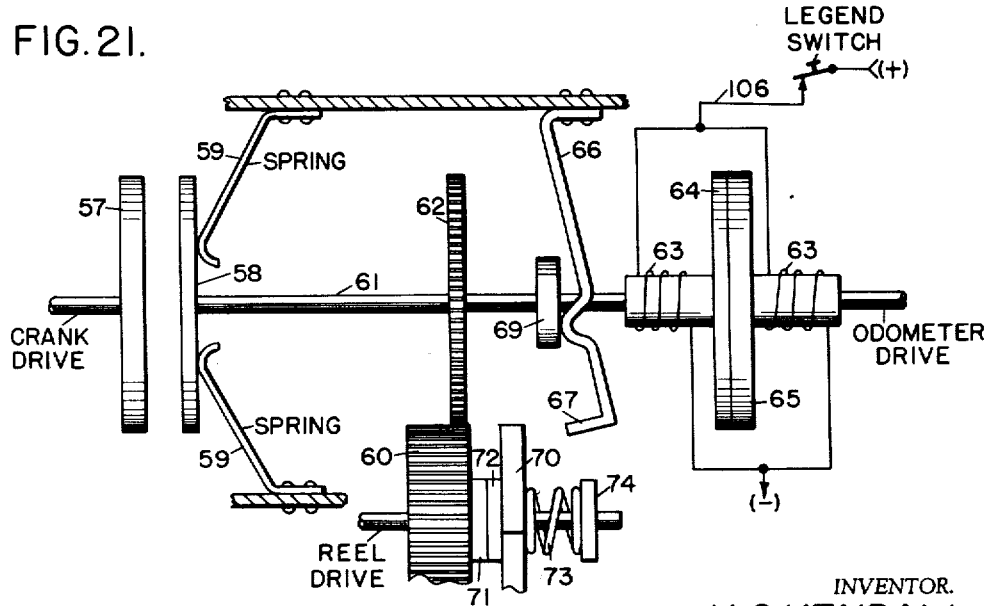

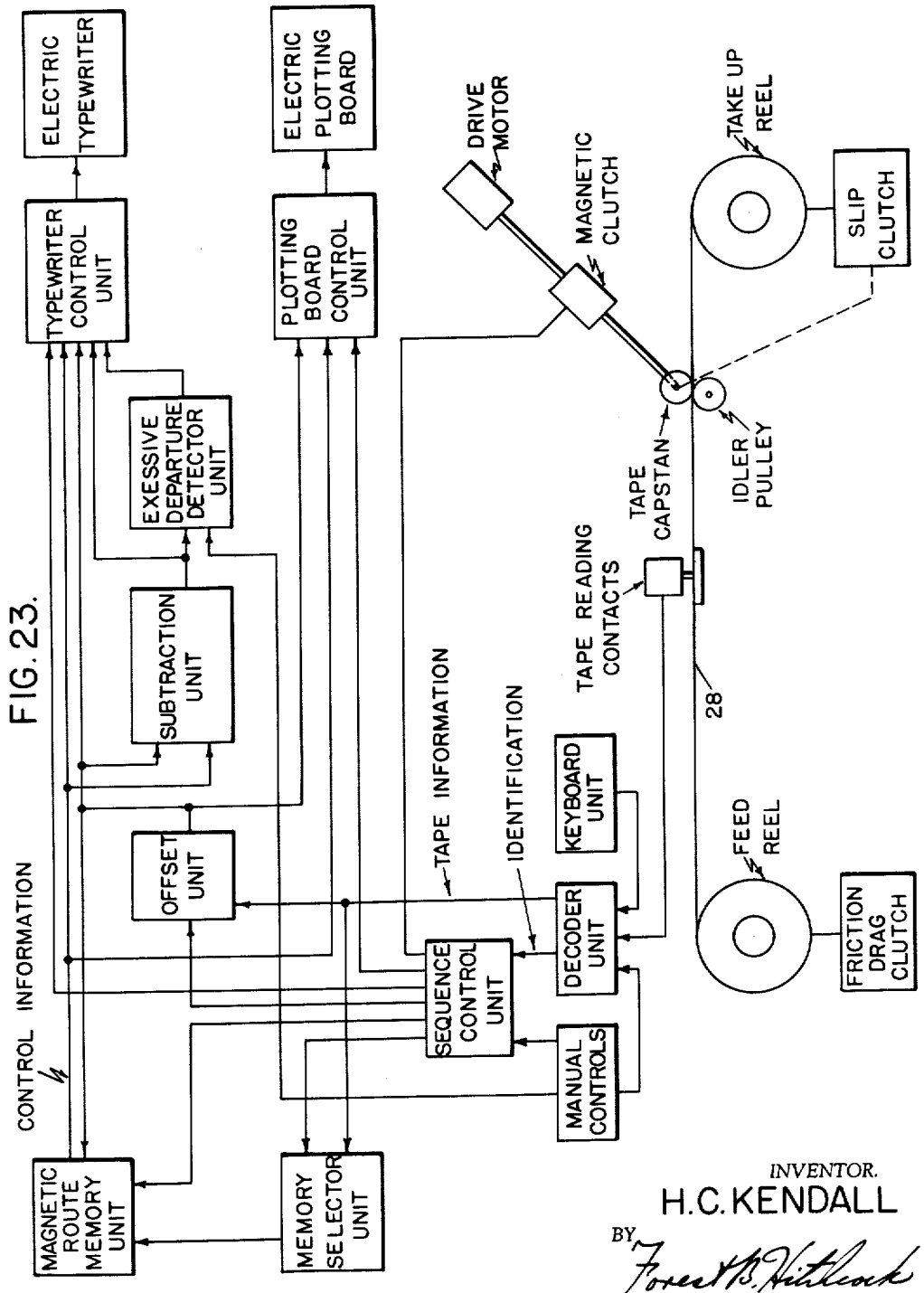

July 30, 1963   H. C. KENDALL   3,099,817
VEHICLE PERFORMANCE MONITORING SYSTEM
Filed Dec. 19, 1958   13 Sheets-Sheet 13

INVENTOR.
H.C. KENDALL
BY
Forest B. Hitchcock
HIS ATTORNEY

United States Patent Office 3,099,817
Patented July 30, 1963

3,099,817
VEHICLE PERFORMANCE MONITORING SYSTEM
Hugh C. Kendall, Rochester, N.Y., assignor to General Signal Corporation, a corporation of New York
Filed Dec. 19, 1958, Ser. No. 781,678
9 Claims. (Cl. 340—172.5)

This invention relates to apparatus and a system for monitoring vehicle performance, and more particularly to apparatus and a system for monitoring the performance of each individual bus in a highway transportation system.

In large bus systems serving metropolitan areas, hundreds of buses are operated simultaneously on many different specified routes. Such bus systems operate from prepared time tables for each specified route, the time table designating the times at which certain buses start to service the route, the times they pass prearranged stops along the route, and the times at which they reach the end of the route. Since adherence to published schedules is vital to the efficient operation of such systems, large bus companies employ roving dispatchers who drive radio equipped cars and "spot-check" field operations, reporting major departures from schedule to a central office via radio. While this form of surveillance by roving dispatchers is fairly effective, it does not meet the principal problem of direct control over the individual bus drivers. Such direct control is deemed necessary to enforce strict adherence to published schedules and is quite important, since departures from schedule cause considerable inconvenience to passengers and lead to severe overloading to some buses while others on the same route carry less than normal loads.

The monitoring system set forth herein provides a solution to this problem of direct surveillance of each individual bus without necessitating further increase in the number of roving dispatchers, and further, it accomplishes this end without necessitating the use of a complicated and expensive communications system between the individual buses, wayside stations, and a central office. Compared to complicated communications systems, it is relatively inexpensive to operate and to maintain.

According to this invention, each bus in the system is equipped with a compact monitoring unit containing a removable roll of tape. When monitor is initially energized by the bus driver—by the insertion of a key and the turning of a crank until an indicator light flashes on, certain basic information is sequentially punched into the tape in the form of various combinations of perforations. During this initial setting by the bus driver, the roll of tape is perforated with identification information—including the bus number, the driver's number, the date and time, as well as the number of the assigned route. Once set, the monitor continues to operate independently of any further action by the driver, and it checks bus performance by noting time on the tape at predetermined intervals of distance travelled by the bus, such as, every one-tenth of a mile. Following each run, the bus driver resets the monitor by turning the crank.

At the end of the day's operation, the tape is removed from the monitor and taken to a central office where it is fed into a tape analyzer unit. This unit decodes the perforations and prints up a record containing all the bus identification information as well as performance information in the form of lapsed time for each predetermined interval of distance the bus travelled on each of its assigned routes. Also, the tape analyzer summons up particular route and time control data which has been stored in magnetic memory circuits, this control data being based upon predetermined time tables. This control data is printed on the record also, along with the differences between the control time and the actual bus-run time. In addition, the analyzer unit draws a graphic presentation of both the control and tape time-distance performance data.

Thus, the system set forth herein furnishes information regarding the performances of all operating buses such that a complete day-to-day analysis of the operation of the system can be made. Further, the information supplied by this invention also serves to automatically police all drivers by providing the bus company with a daily record of each driver's adherence to the schedules.

An object of this invention is to provide a system for monitoring vehicle traffic in a given transportation system whereby information is available to a central office concerning the performance of each individual vehicle without necessitating the use of either a communications network or personnel in the field.

Another object of this invention is to provide each vehicle in a transportation system with a monitor which, following an initial setting, makes a continual check on the vehicle's performance without interrupting the operation of the vehicle or the activities of the driver.

Another object of this invention is to provide a system for monitoring vehicle performance in which vital vehicle identification and performance information, for each vehicle in a vehicle transportation system, is permanently recorded in perforations made on removable tapes.

A further object of this invention is to provide a system for monitoring vehicle performance in which perforated tapes, containing coded information regarding the identity of each individual vehicle in a given transportation system and regarding the performance of each said vehicle on each of its assigned routes, are analyzed by a computer unit which compares the performance information encoded on the tapes with corresponding timetable control data and presents graphic and printed records identifying each vehicle, its performance on, and the control data for, each of its assigned routes and, in addition, any deviation from the control time-table.

Other objects, purposes and characteristic features of the present invention, will be in part obvious from the accompanying drawings, and in part pointed out as the description of the invention progresses.

In describing the invention in detail, reference will be made to the accompanying drawings, in which like reference characters will be used to designate corresponding parts throughout the several views, and in which:

FIG. 1 is a three-dimensional view of the monitor unit to be attached to each vehicle in a transportation system;

FIG. 2 is a representation of a section of the removable tape used in the monitor, showing the various perforation patterns with the information corresponding to each perforation pattern labelled;

FIG. 3 is a code table showing the perforation codes used on the "units," "tens," "hundreds" sections of the perforated tape as illustrated in FIG. 2;

FIG. 4 illustrates the code patterns used in the "thousands" portion of the perforated tape as illustrated in FIG. 2;

FIG. 5 is a code table showing the perforation patterns used in the "code group" portion of the tape illustrated in FIG. 2;

FIG. 6 is a combination schematic and block diagram showing the basic parts of the monitor unit attached to each vehicle;

FIGS. 9, 10, 11 and 12 are simplified diagrams of the basic connections of all of the variable disc-switches utilized by the monitor unit, the switch faces showing the information indicated by each switch position;

FIG. 18 is a schematic and block diagram showing the general arrangement of the circuit in the encoder portion of the monitor unit;

FIG. 19 is a schematic diagram of the group indicator encoder which controls the "code group" perforations characterizing each line of information perforated on the tape;

FIGS. 20 and 21 are two views of the spring biased magnetic clutch which controls the pulse generating cam and alternately connects the tape reel drive to the monitor shaft and to the odometer drive of the monitored vehicle;

FIG. 22 is a schematic diagram of the time-distance pulse control unit which mechanically generates a pulse of current at predetermined intervals of distance travelled by the monitored vehicle;

FIG. 23 is a block diagram of the tape analyzer located at the central office.

Figure 7:
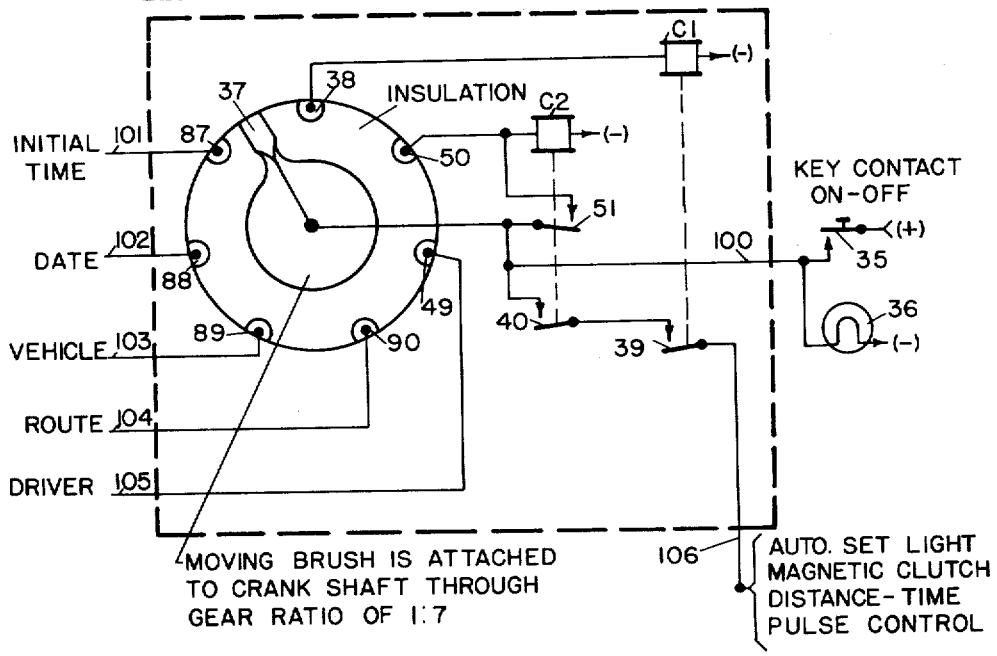
FIG. 7 is a schematic diagram of the legend switch and control circuit actuated by the crank mounted on the vehicle monitor unit.

For the purpose of simplifying the illustration and facilitating the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate connections to the terminals of batteries, or other sources of electric current, instead of showing all the wiring connections to these terminals. The symbols (+) and (−) are employed to indicate the positive and negative terminals respectively of suitable batteries, or other sources of direct current; and the circuits with which these symbols are used always have current flowing in the same direction.

Referring first to FIG. 1, each bus or other vehicle in a transportation system using this invention has attached to it, on or conveniently near the driver's control panel, a monitor unit 26 which is electrically connected to a source of D.C. current through cable 31 and mechanically connected to the vehicle's odometer take-off by flexible shaft 32. The monitor unit 26 holds a removable magazine 27 containing a roll of tape 28 threaded from a feed reel 29 to a take-up reel 30. As the tape 28 is moved from one reel to the other by methods to be disclosed below, it is sequentially perforated by solenoids arranged in a line perpendicular to its direction of motion, as shown in FIG. 2 where the direction of tape motion is assumed to be upward.

It is to be understood that the grouping of the perforating solenoids is dictated by the particular code patterns chosen. For purposes of this disclosure, the solenoids have been arranged in five groups as shown in FIG. 2. The perforation patterns for each of these groups are determined by the code tables illustrated in FIGS. 3, 4 and 5. FIG. 3 is a code table for the four-solenoid groups (designated "units," "tens" and "hundreds" in FIG. 2), while FIG. 4 shows the code table for the two solenoid group (designated "thousands" in FIG. 2). The perforations are interpreted as "digit" or as "month" or "day" depending upon the characterization of each particular line of perforated information, this characterization being designated by the "code group" perforation in accordance with the code table set forth in FIG. 5.

*Initial Phase of Monitor Unit Operation*

The operation of the monitor unit 26 is initiated when the driver's key 33 is inserted in key hole 34 and turned to the "on" position (FIG. 1). This closes contact 35 (see FIGS. 7 and 13), placing (+) on power line 100 and brush 37 of the "legend switch and control circuit" shown in FIG. 7, and lighting pilot light 36. (While the following description will only occasionally make direct reference to FIG. 6 which is a block diagram of the entire monitor unit, the reader should refer to it as the description progresses in order to follow the overall circuit relationships.)

When the monitor unit is first turned on, legend switch brush 37 (in FIG. 7) is normally closed to commutator 38, closing a circuit from powerline 100 through the winding of pulse unit control relay C1 to (−), causing the relay C1 to pick up closing front contact 39. However, it should be noted that no circuit is completed from (+) to control line 106 at this time, due to the fact that front contact 40 is open. The legend switch brush 37 is connected to crank 41 (shown in FIG. 1) through a gear ratio of 1:7 so that it takes seven complete turns of crank 41 to cause one complete rotation of legend switch brush 37, which rotates only in a counter-clockwise direction.

Figure 14:
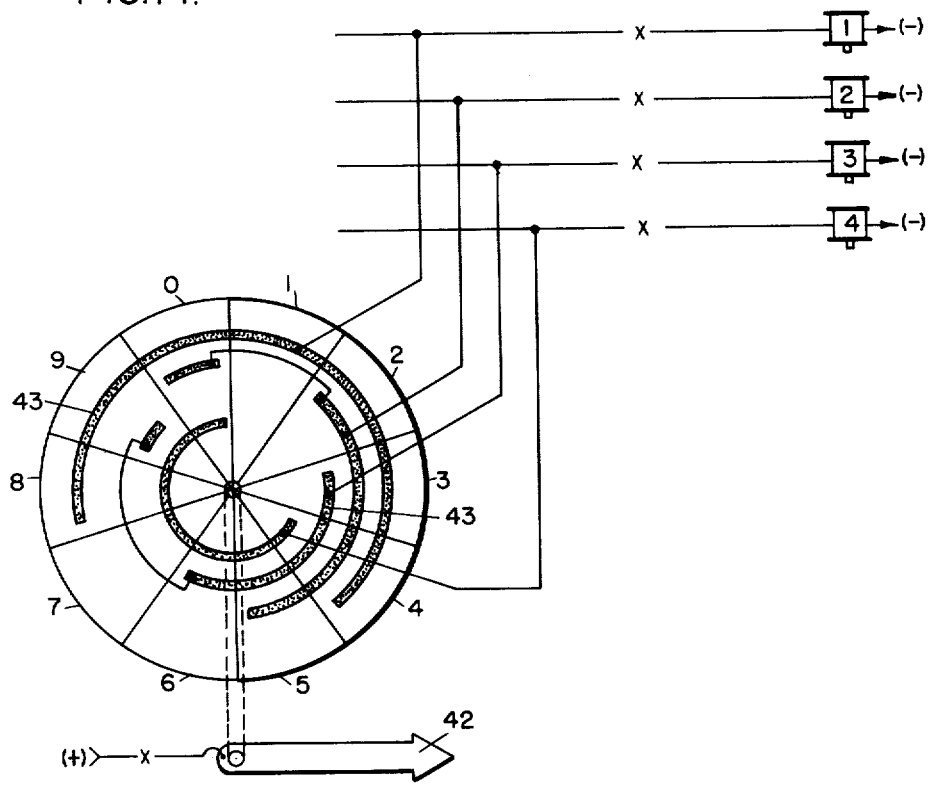
FIG. 14 illustrates a typical 0–9 indicator disc-switch, showing the contacts necessary to closing the proper solenoid circuits for each digit indicated.

As crank 41 is turned, legend switch brush 37, rotating counter-clockwise, opens the circuit to the windings of relay C1 which drops away, opening contact 39, and then separately and successively places (+) on control lines 101, 102, 103 and 104. These control lines carry their respective pulses of (+) potential to the brushes of "time," "date," "vehicle" and "route" indicator disc switches (see FIGS. 9, 10, 11 and 12). The indicator disc-switches are each respectively connected to lines leading to the particular solenoid groups indicated. FIG. 14 shows in detail the commutator arrangement of the "0—9" disc-switches. Each switch is designed so that for each indication, e.g., from 0–9, circuits are closed from the control line and brush 42 through commutators 43 to one or more solenoids in a particular solenoid group in accordance with the code tables set forth in FIGS. 3 and 4. For instance, assuming that the disc-switch shown in FIG. 14 is connected to the "units" solenoid group, when the indicator brush 42 points to "8," circuits are closed to solenoids U1 and U4 (i.e. "1" and "4" of the "units" group) in conformance with the code pattern designated in FIG. 3 for the digit "8."

Figure 15:
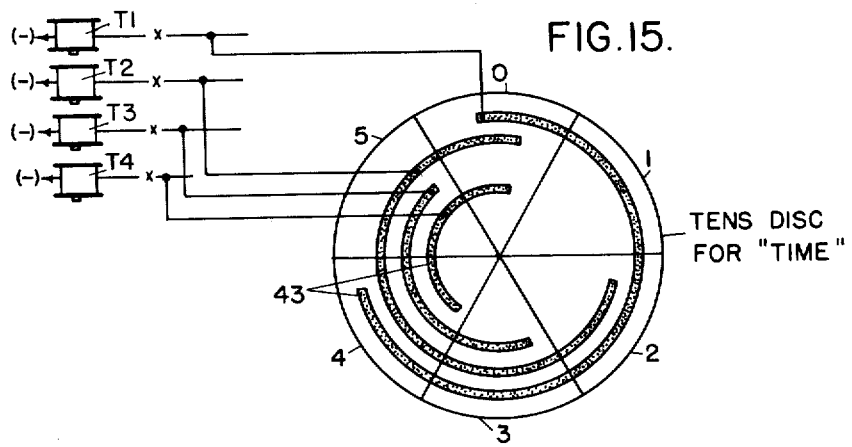
FIGS. 15, 16 and 17 are adaptations of the disc-switch illustrated in FIG. 10 for specific time and date information.
Figure 16:
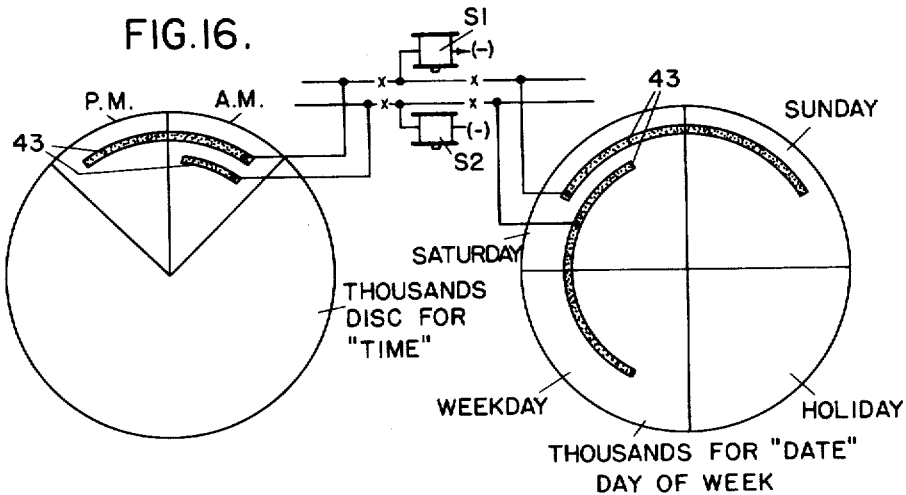
Figure 17:
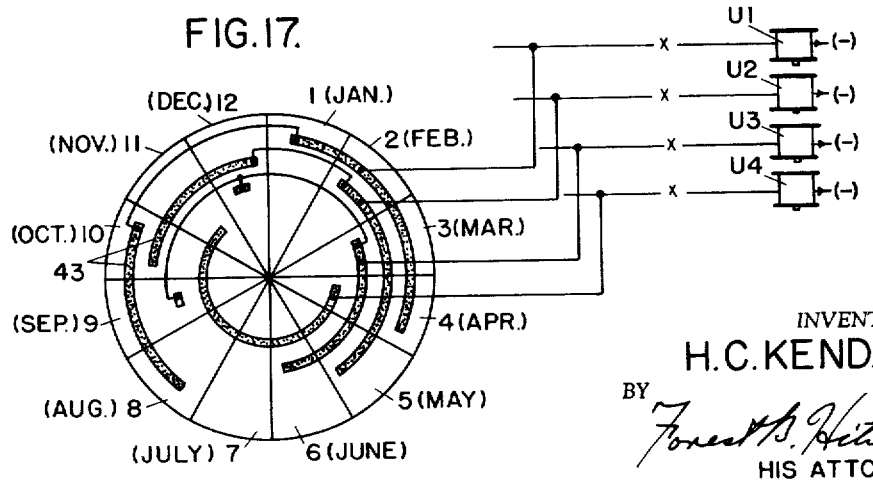

FIGS. 15, 16 and 17 show detailed commutator arrangements for other indicator disc-switches, each being designed in conformity with the code tables for the particular group of solenoids to which it is connected.

The disc-switch indicators for "time" and "date" (FIGS. 1, 11 and 12) are positioned mechanically by a chronometer 44 (see FIG. 1) and can be reset by the driver. The "vehicle" indicators (FIG. 9) are originally set when the monitor unit is attached to the bus, and reset plate 45 (FIG. 1) must be removed in order to change them. The "route" indicators 46 (FIGS. 1 and 10) are set manually by the driver at the start of each run.

Figure 13:
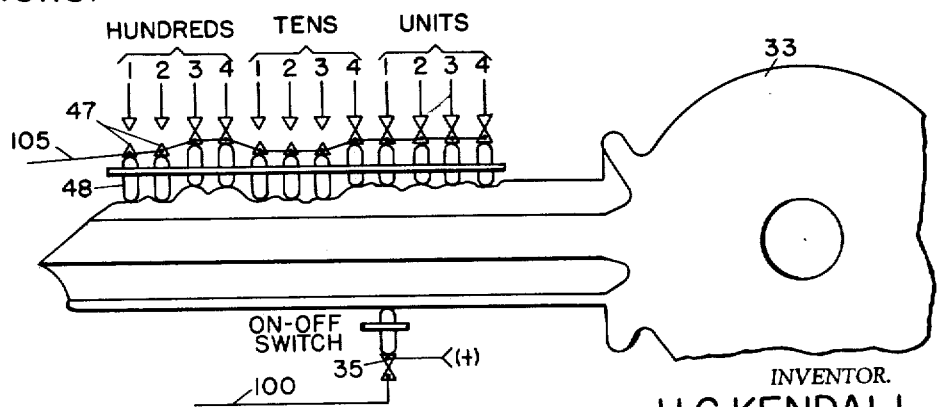
FIG. 13 shows the key contacts which serve both to identify the driver and to turn on and off the power to the entire monitor unit.

Returning now to FIG. 7, on the fifth turn of crank 41 legend switch brush 37 continues to rotate counter-clockwise and passes over commutator 49 connected to control line 105, momentarily placing (+) on the lower contacts 47 of the "driver" key switch shown in FIG. 13. This key switch indicates the driver's identification and has three groups of key contacts for closing circuits to the windings of the three designated groups of tape perforating solenoids. The key 33 is shaped so that when it is inserted in the monitor unit and turned to the "on" position, insulated tumblers 48 operate contacts 47 to selectively close circuits to the three respective solenoid groups in accordance with the code table patterns (FIG. 3) for the particular digits of the driver's assigned identification number.

As legend switch brush 37 rotates past each of the legend switch commutators as just described above, momentarily and sequentially placing (+) on control lines 101—105, circuits are completed from each of the control lines and its respective indicator switches through the encoder (see FIGS. 6 and 18) and through the windings of the selected tape perforating solenoids to (—), energizing the said solenoids in the patterns selected by the various indicator switches. As is apparent in FIG. 18, the encoder is merely a junction box where inputs from each of the various sets of indicator switches tie into fourteen buses, each bus being common to one particular tape perforating solenoid. In the encoder unit, diodes 52 are used to prevent shorting of circuits back through the indicator switches.

FIG. 19 shows the group indicator encoder which is connected in parallel to control lines 101—105. As the legend switch is cranked around, sequentially energizing the control lines to the various indicator units, the group indicator encoder simultaneously selects the correct "code group" perforation pattern for identifying each line of perforated information in accordance with the code table set forth in FIG. 5. Again, diodes 56 are used to prevent shorting of circuits back through the three common buses which connect respectively to the windings of the three group indicator solenoids G1, G2 and G3.

Figure 8:
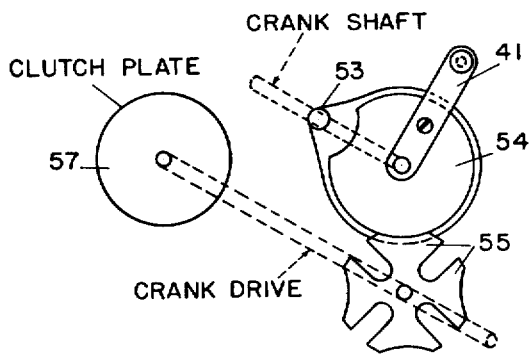
FIG. 8 illustrates the Geneva cam arrangement attached to the monitor crank for moving the tape as the initial information is being cranked onto it.

Between each of the successive energizations of the tape perforating solenoids as just described, the tape roll 28 (FIGS. 1 and 2) is moved ahead by the Geneva cam drive illustrated in FIG. 8. With each revolution of crank 41, pin 53 which is attached to outer edge of cam 54, slips between the leaves of detent 55 turning detent 55 through one-quarter of a revolution. Since take-up reel 30 (FIG. 1) is mechanically connected to detent 55 through clutch face 57 of the magnetic clutch mechanism (see FIGS. 6, 21 and 22), tape roll 28 is moved ahead during one-quarter of each revolution of crank 41. Further, crank 41 is geared to legend switch brush 37 (FIG. 7) so that legend switch brush 37 passes over the successive commutators during the three-quarters of each revolution in which pin 53 is not engaged with detent 55, and therefore the tape is not being moved while being perforated by the solenoids and tearing is prevented.

Thus, following the fifth turn of crank 41 by the bus driver, all of the "legend" information (see FIG. 2) has been encoded on the tape.

Returning once again to FIG. 7, on the sixth successive turn of crank 41, legend switch brush 37 passes commutator 50, closing a circuit from (+), contact 35, brush 37 and commutator 50, through the windings of pulse unit control relay C2 to (—) causing relay C2 to pick up and thereby closing front contacts 40 and 51. The closing of front contact 51 completes a stick circuit which maintains relay C2 in a picked-up position after legend switch brush 37 continues to rotate past commutator 50.

Finally, following a seventh turn of crank 41, the "automatic set" light 55 (FIG. 1) turns on indicating that the initial energization of the monitor unit has been completed and that it is now ready for automatic operation. This results when legend switch brush 37 completes one full rotation and once again contacts commutator 38, closing the circuit through the windings of pulse unit control relay C1 which again picks up and closes front contact 39. In contrast to the initial closing of contact 39 upon the turning of key 33 to "on" (see above), this time a circuit is closed from (+), contact 35, line 100, front contacts 40 and 39 to control line 106, which energizes the "automatic set" light 55, the magnetic clutch, and the time-distance pulse control unit (see FIG. 6).

It should be noted that "automatic set" light 55 will not turn on until all of the "legend" information is perforated on the tape and the unit is ready for automatic operation. After the driver has actually started to drive the route, automatic operation encodes "starting time" (FIG. 2), and "automatic set" light 55 goes off due to the picking up of relay P3 (FIG. 22) as will be explained below. Thus the driver has a constant reminder at the start of each run that he must re-crank the monitor, since he is instructed that "automatic set" light 55 must be on before he begins each run.

*Automatic Phase of Monitor Unit Operation*

The energization of the magnetic clutch switches the drive for tape roll take-up reel 30 from the hand operated crank 41 to the vehicle's odometer drive. During the time that the driver is encoding the "legend" information by turning crank 41, the spring biased magnetic clutch is in the position shown in FIG. 20. Clutch plates 57 and 58 are held together by the tension of springs 59, connecting the crank drive mechanism (shown in FIG. 8 and described above) to reel drive gear 60 by means of floating clutch shaft 61 and gear 62. During this period control line 106 is still open and floating clutch plate 64 is held away from clutch plate 65 by the tension of springs 59. However, with the seventh turn of crank 41, a circuit is completed from (+) through the legend switch and control circuit and control line 106, through the windings of electromagnets 63 to (—). This energizes electromagnets 63 which are attracted to each other because the direction of their windings is such that the north pole of one is juxtaposed to the south pole of the other. Electromagnets 63 are designed so that the electromagnetic force exerted between their pole shoes is much greater than the tension developed by springs 59, and thus, when (+) is placed on control line 106, floating clutch shaft 61 and gear 62 shift to the position shown in FIG. 21. Clutch plates 64 and 65 are now held together by electromagnets 63, connecting the vehicle's odometer drive to reel drive gear 60 by means of floating clutch shaft 61 and gear 62, and disconnecting the crank drive mechanism by holding floating clutch plate 58 away from clutch plate 57.

The operation of the monitor is now taken over completely by the time-distance pulse control unit, shown schematically in FIG. 22, which causes "time" to be perforated one the tape at predetermined intervals of distance travelled by the monitored vehicle. The mechanical elements of this pulse control unit are shown in FIGS. 20 and 21 and the left-hand portion of FIG. 22 which views the elements in cross-section along line E—E' of FIG. 20 in the direction of the arrows. Parts have been omitted from these figures for purposes of clarity.

While the "legend" information is being encoded on the tape by the operation of the hand crank, the mechanical elements of the time-distance pulse control unit are in the position illustrated by FIG. 20. Pulse generating cam 70 is connected to reel drive gear 60 through overdrive friction-clutch plates 71 and 72 which are held together by the tension of coil spring 73 which is anchored by lug 74. Pulse generating cam 70 rotates with reel drive gear 60 until its lip 68 (see FIG. 22) engages finger 67 of cam-stopping spring 66. Reel drive gear 60 continues to rotate in response to the operation of the hand crank, but pulse generating cam 70 is held by cam-stopping spring 66 with slippage occurring between overdrive friction-clutch plates 71 and 72.

When the magnetic clutch is engaged following the encoding of "legend" information as explained above, control lug 69 moves with floating clutch shaft 61 and forces cam-stopping spring 66 into the position shown in FIG. 21, disengaging finger 67 from lip 68 of pulse generating cam 70. Pulse generating cam 70 is thus freed and once again follows the rotation of reel drive gear 60 which is now connected to the vehicle's odometer drive through the magnetic clutch.

It should be noted that the purpose of the mechanical operations just described is to position pulse generating cam 70 as illustrated in FIG. 22, i.e., with detent 75 of pulse generating cam 70 ready to engage movable arm 76.

As the bus begins to move along assigned route, the rotation of its wheels turns the odometer drive which, through the magnetic clutch mechanism and reel drive gear 60, causes the take-up reel to move the tape roll and rotate pulse generating cam 70. Sometime within the first fifty feet of travel, the rotation of pulse generating cam 70 causes movable arm 76 to ride up on detent 75, closing contact 77. Upon this initial closing of contact 77, a circuit is completed from (+) on control line 106 (through legend switch an control circuit as described above), contact 77, through the windings of relay P1 to (−), causing relay P1 to pick up and closing front contacts 78 and 79. The closing of front contact 79 completes a circuit from (+), front contact 79, back contact 80, through control line 109 to the "time" unit disc-switches (see FIG. 6), and then through the "encoder" and selected perforating solenoids to (−) (see FIG. 18). This causes the selected solenoids to perforate the tape in code patterns for the hour and minute digits of the time then appearing on the chronometer.

Simultaneously, a circuit is closed from (+), front contact 79, back contacts 80 and 81, through control line 108, the "group indicator encoder" (FIG. 19), and the windings of code group solenoid G3. This causes solenoid G3 to perforate the tape, identifying the line of digit perforations as "starting time" in accordance with the table set forth in FIG. 5. (Also see FIG. 2).

The actuation of the perforating solenoids is only momentary, since when P1 picks up it closes front contact 78 and completes a circuit from (+), front contact 78, through the windings of relay P2 to (−). The characteristics of relay P2 are such that its pick up is delayed slightly. When relay P2 picks up, it opens back contact 80, opening the circuits to the solenoids. This prevents any tearing of the tape which might arise if the solenoids remained engaged over a longer period of time.

When relay P2 picks up in response to the initial closing of contact 77, it closes front contact 82, closing a circuit from (+) on control line 106 through front contact 82 and the windings of relay P3 to (−), causing relay P3 to pick up, and opening back contacts 81 and 96 and closing front contacts 83 and 84. The opening of back contact 96 extinguishes "automatic set" light 55, while the closing of front contact 83 completes a stick circuit which retains relay P3 in a picked-up position until such time as (+) is removed from control line 106 by the cranking of the legend switch (see FIG. 7) during the initial setting of the monitor unit for the next succeeding run.

As pulse generating cam 70 continues to rotate in response to the bus motion, detent 75 disengages movable arm 76, opening contact 77 and causing relays P1 and P2 to drop away. It should be noted that relay P3 remains stuck in its pick-up position.

For purposes of this disclosure, it is assumed that the gear ratio between the odometer drive and the reel drive gear 60 (see FIG. 21) is such that reel drive gear 60 makes one revolution for every one-tenth of a mile travelled by the monitored bus. Thus, after the bus has travelled one-tenth of a mile, movable arm 76 is once again caused to ride up on detent 75 (FIG. 22), closing contact 77 and picking up relay P1. This closes front contacts 78 and 79 and again completes the circuit through back contact 80 and control line 109 to the "time" unit as just described. However, back contact 81 is now open and front contact 84 is closed since relay P3 is stuck in its picked-up position. Thus, simultaneous with the energization of the "time" unit (and the perforation of the tape with hour and minute digit codes), a circuit is closed from (+), front contact 79, back contact 80, and front contact 84 to control line 107, through the "group indicator encoder" and the windings of code group solenoid G2 to (−) (FIG. 19), causing solenoid G2 to perforate the tape, identifying the line of digit perforations as "distance-time" in accordance with the table set forth in FIG. 5. (Also see FIG. 2.)

Until such time as the scheduled run is completed and the crank is again operated by the driver to encode the "legend" information for the next succeeding run, the time-distance pulse control unit continues to function as just described, causing the time to be successively perforated on the tape with each successive one-tenth of a mile traveled by the monitored bus.

Typical Example of Monitor Unit Operation

For purposes of further explanation, the operation of the monitor unit will now be followed through based upon the assumed facts that on Tuesday, February 3rd driver No. 674 of bus No. 2974 is assigned to route No. 38 for the run to be commenced at 12:40 p.m. in accordance with a given time-table.

When the driver arrives with his bus at the point where he is to start the assigned run, he inserts his identification key 33 into keyhole 34 of monitor unit 26 and turns it to the "on" position checking to see that the pilot light 36 lights up indicating that there is power to the unit. The driver then sets the route indicators 46 in accordance with his assigned route, viz., the "hundreds" indicator to "0," the "tens" indicator to "3," and the "units" indicator to "8" as shown in FIGURE 1. He then sets the "day" indicator 85 to "week day," and checks the "date" indicators 86 to be sure that they correctly show the date, which is assumed to be February 3. As shown in FIGURES 12 and 17, the month is indicated on the units disc-switch as a number from 1 to 12.

Th driver then turns crank 41 until "automatic set" light 55 lights up. As explained above, this requires seven complete turns of crank 41, which cause tape 28 to be perforated with the "legend" information shown in FIGURE 2.

More specifically, when legend switch brush 37 moving in a counter-clockwise direction contacts commutator 87 (FIGURE 7), (+) is connected to control line 101 through line 100 and "on-off" key contact 35. The (+) on control line 101 causes the energization of tape perforating solenoids selected by the "time" indicator disc switches (FIG. 6). It is assumed that at this moment it is 12:32 p.m. and the "time" disc switches, which are geared to the chronometer, are in the position indicated in FIG. 11. The brush of the "units" indicator disc switch is indicating "2," closing circuits through the encoder (FIG. 18) to solenoids U1 and U2. (Disc switch operation is described above and the commutator arrangements for the various individual disc switches are shown in detail in FIGS. 14–17). The "tens" indicator disc switch brush is at "3," closing contacts to solenoids T1, T2 and T3. The "hundreds" indicator—a twelve position disc switch—is indicating "12," closing circuits to solenoids H2 and H3, while the "thousands" indicator—a two position disc switch—is closing a circuit to solenoid S1.

Simultaneously, a circuit is closed from (+) on control line 101 to line 91 and the group indicator encoder (FIG. 19), and through the windings of solenoid G1 to (−).

Thus, with the first rotation of crank 41, the tape is perforated with a line of code patterns indicating "legend time 12:32 p.m." in conformity with the requirements of the code tables set forth in FIGS. 3, 4 and 5.

On the second rotation of crank 41, legend switch brush 37 moves past commutator 87, tape 28 is moved ahead as reel drive gear 60 (FIG. 20) is rotated one-quarter of a revolution by the Geneva cam drive illustrated in FIG. 8, and then legend switch brush 37 contacts commutator 88 placing (+) on control line 102. This causes the energization of tape perforating solenoids selected by the "day," "date" and "month" disc switches, viz., "unit" solenoids U1 and U2 for indicating the perforation pattern for "February," "tens" solenoids T1, T2 and T3 for indicating "3," "hundreds" solenoids H1, H2 and H4 indicating "0," and "thousands" solenoid S2 indicating "week day." Simultaneously, a circuit is closed to line 92 and the group indicator encoder, and through the windings of code group solenoids G1 and G2, identifying the line of perforation patterns as "date" (FIGS. 2 and 19). Thus, following the second revolution of crank 41 tape 28 is perforated with a line of patterns indicating "date February 03—week day" as shown in FIG. 2.

Similarly, legend brush switch 37 is cranked past commutators 89, 90 and 49 causing tape 28 to be perforated with "bus" "route" and "driver" information, the perforation patterns being determined by the selection of particular solenoids in each group of solenoids in accordance with the position of the "bus" and "route" disc switches (FIGS. 9 and 10), the tumbler-controlled contacts 47 of the key switch (FIG. 13), and by the group indicator encoder (FIG. 19). The position of the various disc switches and contacts 47 of the key switch cause the tape to be perforated with the legend information as shown in FIG. 2.

As the driver continues to turn crank 41, legend switch brush 37 contacts commutator 50, sticking up relay C2 (FIG. 7), and then moves on to contact commutator 38, picking up relay C1 and closing the circuit from line 109 through front contacts 40 and 39, placing (+) on control line 106. This causes "automatic set" light 55 to turn on and the driver stops turning crank 41. The monitor unit is now ready for automatic operation.

At 12:40 p.m. the driver starts the bus along his assigned route. At this moment pulse generating cam 70 is in the position shown in FIG. 22 as explained above. After the bus has travelled a few feet, movable arm 77 rides up on detent 75, since pulse generating cam 70 is being driven through reel drive gear 60 by the odometer drive of the bus as explained above. This closes contact 77 picking up relay P1 and closing a circuit from (+) front contact 79 and back contact 80 through line 109 to the disc switches of the "time" unit. Simultaneously, a circuit is closed from (+) front contact 79, back contact 80 and back contact 81 through line 108, the group indicator encoder (FIG. 19), and through the windings of solenoid G3 to (—). This causes tape 28 to be perforated with a line of patterns indicating "starting time 12:40 p.m." as shown in FIG. 2. Immediately thereafter relay P2 picks up closing the circuit from (+) on line 106 through front contact 82 and the windings of relay P3 to (—), causing relay P3 to pick up. As explained above, P2 sticks itself in its energized position and, at the same time extinguishes "automatic set" light 55 by opening back contact 96.

After the bus has travelled a tenth of a mile, pulse generating cam 70 has made a full rotation and movable arm 76 once again rides up on detent 75, closing contact 77. This causes relay P1 to pick up once again closing the circuit through front contact 79 and back contact 80, through the disc switches of the "time" unit, causing the energization of selected tape perforating solenoids. Simultaneously, a circuit is closed from (+) front contact 79, back contact 80 and front contact 84, through line 107, the group indicator encoder (FIG. 19) and the windings of solenoid G2, to (—). This causes the perforation of tape 28 with a line of patterns indicating "distance-time 12:41 p.m." as shown in FIG. 2.

Thereafter for every one-tenth of a mile travelled by the bus along its assigned route, the time is encoded on tape 28 in the manner just described.

When the bus arrives at the end of its assigned run, the driver then resets monitor units 26 by resetting the route indicators 46 and by again turning crank 41 until the automatic set light 55 turns on once again.

At the end of the day's runs, the driver deenergizes the monitor unit by removing his key 33, opening on-off contact 35. The bus is then returned to the garage where tape magazine 27 is removed from monitor unit 26 and tape roll 28, containing the perforated information described above, is turned in at the central office for analysis.

*Tape Analyzer Operation*

The tape analyzer unit, shown by block diagram in FIG. 23, is a combination of devices well known in the art. The tape reading means consists of simple mechanical devices for feeding tape 28 past tape reading contacts, the latter being brushes capable of closing electric circuits whenever contact is made through perforations in tape 28.

The magnetic route memory unit is a large digital memory made up of digital storage elements such as magnetic cores stacked in multiple matrices. Magnetic memory core matrices are already well known in the art, and are revealed in several patents, attention being called to V. C. Wilson, No. 2,652,501, issued September 15, 1953 (magnetic memory cores), and J. A. Rajchman et al. No. 2,784,391, issued March 5, 1957 (magnetic memory core networks).

The offset, subtraction and successive departure units are digital computers capable of digital addition and subtraction. Such computer units are readily available in the industry in all sizes and shapes (e.g. see trade magazine, Electronics, August 1958), most of which are designed on variations of a basic circuitry for binary computation. This basic circuitry is revealed in several patents typical of which is G. A. Morton et al., No. 2,462,275, issued February 22, 1949.

The electric typewriter and plotting board units are also commercially available in a variety of forms adaptable to the purposes of this invention for operation as will be described below.

The decoder unit steps off each line of digital information read from the tape, differentiating between each series of steps upon the basis of the particular code group ("time," "date," "route," etc.) accompanying each line of perforated information, while the sequence control unit steps the operation of the various units in the sequence to be described below. The stepping of the sequence control unit can be varied by manual controls which can select or omit the operation of each of the various units, e.g., the printing of the tape information without using the plotting board, or without comparing it to stored "control" data, etc.

During the following description of the operation of the tape analyzer, it is assumed that "control" data has already been stored in the magnetic memory core matrices, either from a "control" tape or directly by means of the key board.

The tape to be analyzed, in this case the tape brought in by driver 674 following his scheduled runs on February 3rd, is placed in the tape reading analyzer unit. Power is then turned on to the unit and the manual controls are set (for purposes of this description) for complete tape analysis. The drive motor is energized and the sequence control unit energizes the magnetic clutch feeding tape 28 past the tape reading contacts.

When the tape reading contacts sense the perforations for legend "time" (see FIG. 2), the sequence control unit deenergizes the magnetic clutch stopping the tape. The decoder unit then scans the legend "time" information and steps it to the memory selector unit which places this information in temporary storage.

Figures 24, 25:
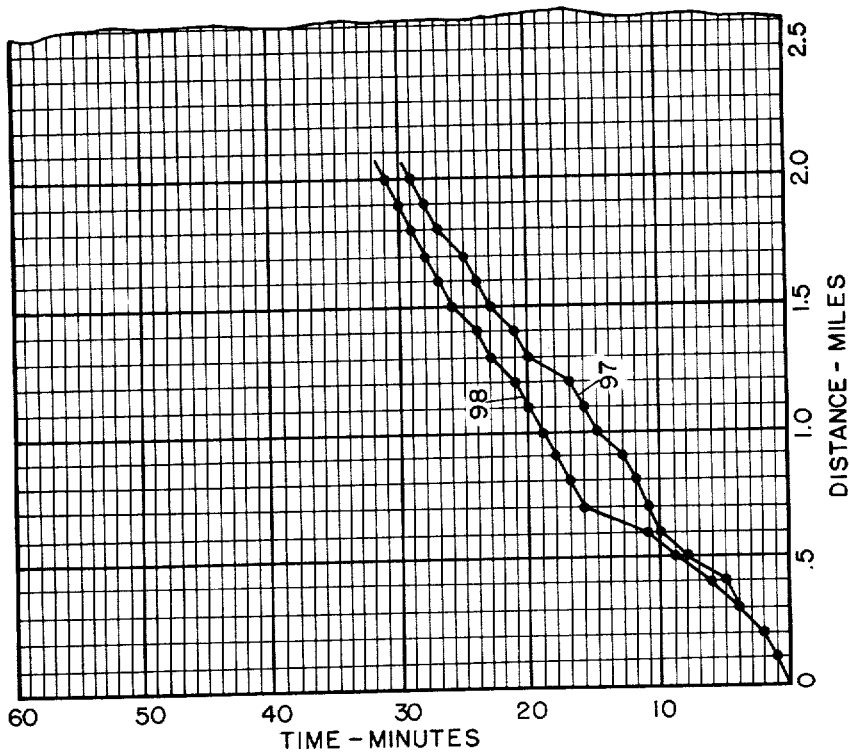
FIG. 24 illustrates a typical record printed by the typewriter unit of the tape analyzer.
FIG. 25 shows a typical graph drawn by the electric plotting board unit of the tape analyzer.

The sequence control then energizes the magnetic clutch which continues to feed the tape past the tape reading contacts until the legend "date" perforations appear. The legend "date" information is scanned and identified by the decoder unit and stepped to the memory selector unit and to the offset unit. The information is placed in temporary storage by the memory selector unit, and at the same time it passes unchanged through the offset unit to the typewriter control unit and is typed on the heading of the printed record as shown in FIG. 24.

When the electric typewriter has completed its typing of the date, the sequence control unit then steps the energization of the magnetic clutch, once again moving the tape. When the legend "bus" identification information appears at the tape reading contacts, the magnetic clutch is again deenergized. The decorder scans and identifies the legend "bus" identification information and steps it to the offset unit through which it passes unchanged to the typewriter control unit, which types the information on the heading of the printed record.

Following the printing of this information the sequence control unit again energizes the magnetic clutch until the legend "route" identification information appears at the tape reading contacts. This information is scanned and identified by the decoder and stepped to the memory selector unit and to the offset unit. The memory selector unit places this route information in temporary storage, while the offset unit passes it unchanged to the typewriter control unit which causes it to be typed on the heading of the printed record.

The sequence control unit then energizes the magnetic clutch until the legend "driver" appears at the tape reading contacts. This information is fed from the decoder through the offset unit to the typewriter control unit and is typed on the heading of the printed record.

The sequence control unit next closes circuits to the magnetic route memory unit through the memory selector unit. The circuits selected depend upon the stored "route," "date" and "time" information. This results in the selection of the particular control information stored in the magnetic route memory unit and corresponding to the run being analyzed. The sequence control unit then steps the selected time-distance "control" information from the magnetic route memory unit to the plotting board control unit. This stepped "control" information is then plotted on the electric plotting board in time-distance curve 97 as shown in FIG. 25. When the stored information has been plotted the sequence control unit resets both the magnetic memory unit and the plotting board control unit to the starting point.

The magnetic clutch is then energized once again until the "starting time" perforations appear at the tape reading contacts. This information is scanned and identified by the decoder unit and stepped to the offset unit. The offset unit stores this information temporarily and simultaneously feeds it unchanged to the typewriter control unit which causes it to be typed on the printed record heading.

The sequence control unit then commands the typewriter control unit to type "0" at the top of the first four columns of the printed record as shown in FIG. 24. The magnetic clutch is then energized until the first "distance-time" information appears at the tape reading contacts. This information is scanned and identified by the decoder unit and stepped to the offset unit where it is subtracted from the stored "starting time." This difference computed by the offset unit is then fed to the plotting board control unit which causes the plotting board to draw a start line between "0" unit and the point defined by the 0.1 mile mark and this time difference. The plotting board control unit places this time in temporary storage for use in drawing the next straight line segment.

Simultaneously, the sequence control unit has again caused the magnetic route memory unit to step and read out the "control" time for the 0.1 mile position. The typewriter control unit is then commanded to type 0.1 in the first column, the "control" time fed from the magnetic route memory unit in the second column, and the "difference" time from the offset unit in the third column.

The last two signals, i.e., the "control" time and "difference" time have meanwhile been fed to the subtraction unit which computes the difference between the two said times, feeding this difference to the typewriter control unit where it is printed in the fourth column entitled "departure."

If this last stated difference computed by the subtraction unit exceeds a predetermined amount (set by manual controls), the excessive departure detector unit supplies a signal to the typewriter control unit which commands the electric typewriter to type an X in the fifth column denoted "excessive." The sequence control unit then energizes the magnetic clutch until the next succeeding "distance-time" information appears at the tape reading contacts. The sequence control unit next causes the control time for the 0.2 mile position to be stepped from the magnetic route memory unit and this is plotted and compared to the difference time computed by the offset unit in the manner just described above.

This sequence of operations continues until such time as the next line of perforations identified by the code group "legend time" appears at the tape reading contacts. This causes the sequence control unit to reset its stepping circuits for the analysis of the next run.

It should be noted that the above steps do not necessarily occur precisely in the order in which they have been described, since many of the steps occur simultaneously.

Having described the apparatus and system of operation of such apparatus for monitoring the performance of vehicles as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. A system for monitoring the operation of a vehicle having an odometer, comprising a recording medium for receiving characteristic data, data producing means effective when operated to record distinctive indications on said recording medium, a plurality of data selection means for selecting the distinctive indications of said data producing means, circuit means electrically connecting each of said plurality of data selection means to said data producing means effective when activated selectively to operate said data producing means to record indications in accordance with a respective one of said data selecting means, first activating means operable to activate momentarily one of said circuit means, a second activating means effective when operated repetitively to activate another of said circuit means at spaced intervals, and means connecting operatively said odometer to said second activating means after the operation of said first activating means to cause the operation of said second activating means upon the initial movement of the vehicle and the repeated operation of said second activating means to correspond to increments of distance traveled by said vehicle.

2. A system for monitoring from a predetermined starting point the progress of a vehicle having an odometer driving means, comprising means operatively connected to said driving means to produce a first pulse upon initial movement of said vehicle from the predetermined starting point and succeeding pulses at predetermined increments of travel from said starting point, a chronometer means, means operatively connecting said chronometer means to the pulse producing means to indicate the time according to said chronometer means in response to said first pulse and each of said succeeding pulses.

3. A system for monitoring from a predetermined starting point the operation of a vehicle, comprising means effective to produce a first signal upon the initial getting underway of said vehicle from said predetermined point, means effective to produce a succeeding signal at each of a predetermined increments of travel of the vehicle as measured from said first signal, and recording means responsive to said first signal and each succeeding signal to record characteristic data.

4. A system for monitoring from a predetermined starting point the operation of a vehicle having an odometer driving means, comprising a recording medium, a pulse producing means, means operatively connecting said pulse producing means to the odometer driving means to produce a first pulse upon the movement of said vehicle away from said starting point and a succeeding pulse at the end of each of a predetermined increments of travel of said vehicle from the first pulse, a chronometer means, actuating means operatively connected to said chronometer means effective when activated to operate said recording medium distinctively in accordance with the time as indicated by said chronometer means, and means connecting said pulse producing means to said actuating means effective to activate said actuating means in response to said first pulse and each of said succeeding pulse, whereby the starting time and the time of reaching predetermined distances by the vehicle along the route is recorded by the recording medium.

5. A system for monitoring from a starting point the operation of a vehicle having odometer driving means, a plurality of data selection means operative when activated to produce a distinctive output in accordance with the selected data, recording means adapted to receive distinctive data in response to a distinct output, a manually operable means for activating each of said data selection means in succession, pulse producing means operative to activate one of said data selection means cyclically, a normally engaged first clutch means effective to to operate said pulse producing means to a distinctive condition upon the operation of said manually operable means, a second clutch means effective when engaged to cause the operation of said pulse producing means by said odometer drive means, and means operative to disengage said first clutch means and engage said second clutch means upon the effected operation of said manually operable means, said distinctive condition of the pulse producing means being such that said one data selection means is activated in response to the initial movement of the vehicle when said second clutch means is engaged, whereby distinctive data is recorded by said recording means upon the initial starting of the vehicle and at predetermined intervals of distance thereafter.

6. A system according to claim 5 wherein said pulse producing means is a cam means which activates said one data selection means at predetermined angular positions and said cam means is operated to the predetermined angular position upon the initial movement of the vehicle when said second clutch means is engaged.

7. A system according to claim 6 wherein said one data selection means is a chronometer, and wherein the completed operation of said manually operable means is effective to cause the data selection means to record indications in accordance with the chronometer upon each predetermined angular position of the cam means whereby the time of starting of the vehicle and the time when the vehicle reaches the end of each predetermined distance of travel is recorded by the recording means.

8. A system for monitoring from a starting point the operation of a vehicle having odometer drive means, a plurality of data selecting means effective when activated to produce a distinctive output in accordance with respective selected data, a data recording means adapted to record selected data at a distinct point of the recording means, means for driving an elongate tape past said distinct point on the recording means, a manually operable means for activating each of said data selection means in succession, cam means operative to activate one of said data selection means at predetermined angular positions cyclically, first clutch means operative to drive said tape driving means in response to the operation of said manually operable means to cause said recording means to record selected data at spaced intervals along the tape and to operate said cam means to a distinctive angular position, second clutch means when engaged effective to drive said tape driving means and said cam means by the odometer drive means, means responsive to the completed operation of said manually operable means effective to disengage said first clutch means and engage said second clutch means, said distinctive angular position of the cam means being such that said one data selection means is activated in response to the predetermined angular position of the cam means upon the initial movement of the vehicle when said second clutch means is engaged, whereby the odometer drive means operates the cam means to activate said one data selection means upon the starting up of the vehicle and at predetermined distances of travel thereafter.

9. A system according to claim 8 wherein said cam means is mounted to be driven normally with said tape driving means and further includes stop means effective to cause said tape drive means to move relative to the cam means when the second clutch means is disengaged and the cam means is in said distinctive angular position.

References Cited in the file of this patent

UNITED STATES PATENTS

| | | |
|---|---|---|
| 1,471,850 | Kimes et al. | Oct. 23, 1923 |
| 1,899,956 | Greenley | Mar. 7, 1933 |
| 2,341,118 | Rodanet | Feb. 8, 1944 |
| 2,385,399 | Branham | Sept. 24, 1945 |
| 2,572,132 | Giroud | Oct. 23, 1951 |
| 2,811,309 | Piper et al. | Oct. 29, 1957 |
| 2,819,841 | Blashfield | Jan. 14, 1958 |
| 2,920,818 | Taylor et al. | Jan. 12, 1960 |
| 2,987,366 | Meyers | June 6, 1961 |

OTHER REFERENCES

Publication I; Wilkes, M.V., Automatic Digital Computers, John Wiley and Sons, N.Y., pp. 86, 106–14, QA 76.5 W5a (1957).